July 18, 1933.  H. WILTSCH  1,919,179
APPARATUS FOR REMOVING WATER FILM FROM HEAT TRANSMITTING WALLS
Filed Nov. 27, 1931
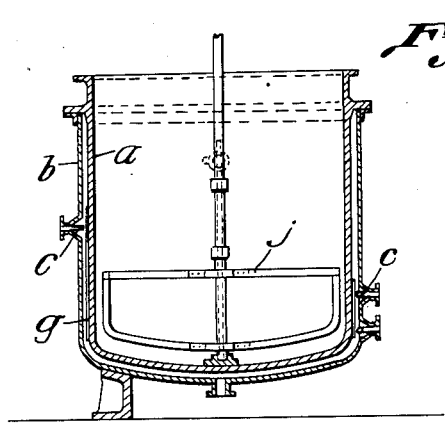
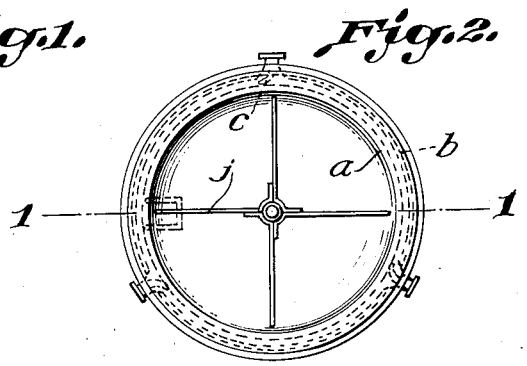
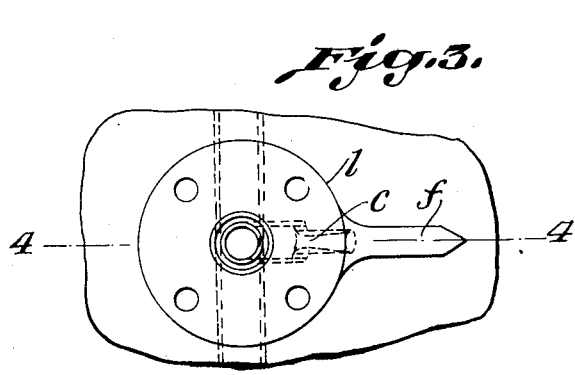
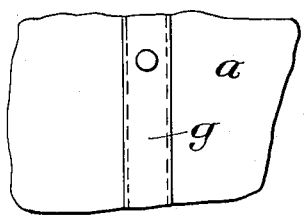
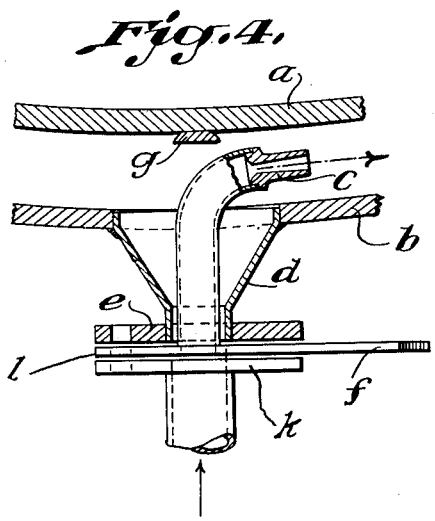
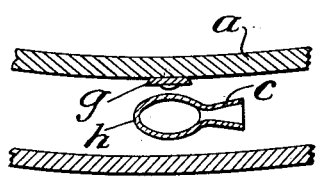

Patented July 18, 1933

1,919,179

UNITED STATES PATENT OFFICE

HANS WILTSCH, OF BERLIN-CHARLOTTENBURG, GERMANY

APPARATUS FOR REMOVING WATER FILM FROM HEAT TRANSMITTING WALLS

Application filed November 27, 1931, Serial No. 577,728, and in Germany December 16, 1930.

In the chemical industry and other industrial branches apparatuses and devices, such as driers, boilers, superheaters, pans with a heating jacket are employed to which the steam or heating medium is supplied in various manners.

In the known devices of this type the heating is carried out by supplying compressed steam into the vessel wall, for which purpose a steam jacket is mostly arranged around a certain portion of the apparatus in question. In these known devices the hot steam entering condenses on the walls in a uniform water film, which renders difficult the transfer of heat. The thickness of this water film evidently increases towards the lowest point of the apparatus so that the transfer of the heat is particularly bad at the lowest points.

This bad transfer of heat in the known devices is avoided according to the invention in that nozzles are provided, through which the steam enters the heating jacket at a high speed whereby a favourable movement of the heating steam and at the same time an intensive movement of the water film is effected.

In order to remove the water film, guide bars are arranged according to the invention in vertical direction, bevelled towards the inner vessel. The water film is thus forced by the high speed of the steam against the bars, where drops are rapidly formed and the water of condensation is thus rapidly conducted off from the heating walls. Consequently, by this arrangement, the water film formed by the condensed steam is continually led off so that the heating wall has no longer a continuous water film. The introduction of the heating steam in the known arrangements was effected without any positive guiding or inner circulation tubes with perforations were provided through which the steam flowed to all sides of the steam jacket. By the arrangement of double flange nozzles, which are situated at certain heights and positions vertically superposed and juxtaposed in a certain direction, an intensive movement in a predetermined direction is imparted to the heating steam or heating medium. The nozzles are adjustable and removable, and moreover the direction of flow in the individual nozzles can be made recognizable from the outer side, the direction indicator being constructed at the same time as a handle for any turning of the nozzle which may be necessary. The nozzles arranged in different positions can also be turned in any direction, so that the greatest variety of manners of flow can be obtained in the jacket, namely in the same, cross or counter direction to the direction of movement of the stirring apparatus. If, for example, it is desired to work only with the heating medium flowing in the same or opposite direction of rotation to that in which the stirring apparatus rotates, the nozzles may be accommodated in the heating jacket in a different manner, namely so that a row of flange nozzles is mounted in a pipe adapted to be inserted from the top, the apertures of these nozzles being all situated in a certain direction.

A further important advantage of the invention is, that it is possible to employ steam also for heating with the same apparatus and the same nozzles by suitably reversing. Consequently, it is possible to adapt the apparatus to the existing working conditions in a short space of time.

An embodiment of the invention is illustrated by way of example in the accompanying drawing in which:

Fig. 1 shows in vertical section on the line 1—1 of Fig. 2 a vessel with heating jacket and nozzles arranged in the heating jacket.

Fig. 2 is a top plan view of Fig. 1.

Fig. 3 shows in side elevation the handle for adjusting a nozzle constructed at the same time to serve as indicator.

Fig. 4 is a horizontal section through one of the nozzles.

Fig. 5 shows in elevation a portion of the vessel wall with guide bar,

Fig. 6 is a cross section through a nozzle arrangement with rigid vertical feed tube.

The apparatus $a$ which may be a dryer, boiler, superheater or the like, is surrounded by a separate heating jacket $b$. Vertical rows of nozzles $c$ arranged side by side in the outer wall of apparatus $a$ extend into the heating jacket $b$. The nozzles are centered in a conical tube $d$ by means of annular flanges $e$ and $k$ and after loosening the screw connection between the annular flanges $e$ and $k$ can be adjusted into another direction in the heating jacket. The flange $l$ having a handle $f$ serving for turning each nozzle serves at the same time as direction indicator so that it is possible to see from the outer side the direction of the nozzle $c$. On the inner wall of the heating jacket which forms the wall of the apparatus $a$ guide bars $g$ are provided at different distances apart in vertical direction. If the heating steam is introduced in the heating jacket through the individual nozzles, it imparts movement to the water film forming particularly on the inner jacket wall $a$, owing to its energy of flow and high speed. Whereas in former apparatuses without nozzles the steam speed only amounts on the average to one meter per second, the steam speed can be increased by the nozzles to above sound speed so that according to the present day state of science a considerably better heat transmission is obtained. As compared with these speeds the speed of the steam in the older apparatuses may be described as stagnant steam. By the arrangement of the vertical guide bars $g$ a resistance will be offered to the water film which is being propelled by the steam and, owing to the edges of the guide bars being bevelled towards the inner wall of the jacket, the drop formation is facilitated by the adhesion occurring. This rapid drop formation presents the advantage that the condensed steam can easily flow off on the guide bars so that no permanent water film can form because the same is immediately conducted off on the bars. Owing to the possibility of adjusting the nozzles $c$ it is possible to inject the steam into the jacket in different directions, namely in the same or opposite direction to that in which the stirring mechanism $j$ rotates or at an angle thereto. This depends upon the manner and direction in which the stirring mechanism in the interior of the apparatus is driven.

Instead of employing separate adjustable nozzles an arrangement may be provided which feeds the steam into the jacket through a vertical tube $h$ carrying nozzles $c$ fixed thereon. In this arrangement it is likewise possible to inject the steam in the same or the opposite direction to that in which the stirring mechanism $j$ rotates.

I claim:

Apparatus for removing water film from heat transmitting walls of dryers, boilers, superheaters, vats and the like in which heating medium is introduced into a jacket by means of nozzles, comprising in combination with the heating jacket, nozzles extending into said jacket, flanges constructed as direction indicators, on said nozzles outside said jackets, flanges connecting said nozzles to the outer wall of said jacket through the intermediary of said indicator flanges, adapted to be unscrewed to allow of adjustment of said nozzles by means of said indicator flanges and guide bars on the inner wall in said jacket having inwardly bevelled edges adapted to cause a rapid drop formation on its inclined edges and continually remove the condensed water film caused by the steam supplied through said nozzles.

HANS WILTSCH.